United States Patent
Lee et al.

(10) Patent No.: US 7,530,095 B2
(45) Date of Patent: May 5, 2009

(54) AUTHENTICATION, AUTHORIZATION AND ACCOUNTING (DIAMETER) PROTOCOL-BASED ACCOUNTING METHOD USING BATCH PROCESSING

(75) Inventors: Byung Gil Lee, Daejeon (KR); Mal Hee Kim, Daejeon (KR); Hyun Gon Kim, Daejeon (KR); Sung Won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1174 days.

(21) Appl. No.: 10/704,047

(22) Filed: Nov. 6, 2003

(65) Prior Publication Data

US 2004/0098612 A1 May 20, 2004

(30) Foreign Application Priority Data

Nov. 7, 2002 (KR) ............... 10-2002-0068908

(51) Int. Cl.
*G06F 19/00* (2006.01)
(52) U.S. Cl. .......................... 726/4; 705/30
(58) Field of Classification Search ............. 726/4, 726/21, 28, 29; 713/170, 168; 705/1, 64–79, 705/30; 709/229
See application file for complete search history.

(56) References Cited

U.S. PATENT DOCUMENTS

| 6,769,000 | B1 * | 7/2004 | Akhtar et al. | 707/103 R |
| 7,293,096 | B1 * | 11/2007 | Foltak et al. | 709/228 |
| 2002/0152319 | A1 * | 10/2002 | Amin et al. | 709/232 |
| 2002/0188562 | A1 * | 12/2002 | Igarashi et al. | 705/40 |
| 2003/0125969 | A1 * | 7/2003 | Kizer et al. | 705/1 |
| 2003/0149772 | A1 * | 8/2003 | Hsu et al. | 709/227 |
| 2003/0212573 | A1 * | 11/2003 | Dorrance et al. | 705/1 |
| 2003/0212800 | A1 * | 11/2003 | Jones et al. | 709/228 |
| 2003/0233580 | A1 * | 12/2003 | Keeler et al. | 713/201 |
| 2004/0172260 | A1 * | 9/2004 | Junger et al. | 705/1 |

FOREIGN PATENT DOCUMENTS

KR     1020010091169     10/2001

OTHER PUBLICATIONS

"A Study of AAA Implementation based on the PKI for the Mobile Networks", Gwan Yeon Kim, et al., Department of Electrical & Electronic Engineering, Chung-Ang University, 4 pages.

* cited by examiner

*Primary Examiner*—Gilberto Barron, Jr.
*Assistant Examiner*—Abdulhakim Nobahar
(74) *Attorney, Agent, or Firm*—Blakely, Sokoloff, Taylor & Zafman

(57) ABSTRACT

The AAA client generates accounting data, transmits an accounting data transmission request message to the AAA server, and then receives a response message to the accounting data transmission request message from the AAA server. If receiving a transmission failure response message for the accounting data from the AAA server, the AAA client stores accounting data generated after receiving the transmission failure response message, and if an amount of the stored accounting data is increased to a certain limit, the AAA client sets an identifier for a batch accounting application in the accounting data and transmits an accounting data transmission request message, including stored batch accounting data and the session information, to the AAA server. The AAA server confirms the identifier and the transmission request message and searches the accounting record for session information mapped to the session information included in the ACR message.

9 Claims, 7 Drawing Sheets

| Application | Application ID |
|---|---|
| Mobile IP | 1 |
| NASREQ | 4 |
| Relay | 0xffffffff |
| Batch multi-accounting transmission | 8 (Newly added) |

FIG. 4

| Stored data type | Class | Contents |
|---|---|---|
| Previously stored session data (Stored in sever after authentication) | Service type | Mapping identifier |
| | AAA system identifier | Mapping identifier |
| | Client domain | Mapping identifier |
| | Client session ID | Mapping identifier |
| | Accounting multi-session ID | Mapping identifier |
| | Accounting multi-session ID | Mapping identifier |
| | Subscriber ID (Email format NAI) | Mapping identifier |
| Accounting data to be additionally stored (Stored in client) | Acct record type | Accounting data |
| | Acct record number | Accounting data |
| | Acct input octet | Accounting data |
| | Acct input packet | Accounting data |
| | Acct output octet | Accounting data |
| | Acct output packet | Accounting data |
| | Accounting results | Real-time accounting results disply |

FIG. 5

AUTHENTICATION, AUTHORIZATION AND ACCOUNTING (DIAMETER) PROTOCOL-BASED ACCOUNTING METHOD USING BATCH PROCESSING

BACKGROUND OF THE INVENTION

1. Field of the Invention

The present invention relates, in general, to authentication, authorization and accounting (AAA) service systems and, more particularly, to an AAA protocol-based accounting method using batch processing, in which only batch accounting process is decided in advance and used between peer networks to substitute a real-time accounting for batch accounting in order to process batch accounting between an AAA server and an AAA client from the first stage of the process, or which basically processes real-time accounting, and transmits failed accounting data later in a batch processing manner if the transmission of the accounting data fails, thus supplementing the transmission of the accounting data, and an accounting method.

2. Description of the Prior Art

Authentication, Authorization and Accounting (AAA) functions refer to the functions of processing authentication, authorization and accounting of subscribers. A strongest point of mobile communication is that a user can communicate with anyone, anytime, anywhere through roaming or handoff technology. If such roaming or handoff technology is realized over the Internet Protocol (IP)-based wireless Internet, a mobile IP protocol is used to allocate IP and support a mobile network. In mobile communications supporting the mobile IP, at the time of roaming, a mobile user must be authenticated by and allocated IP from a foreign network so as to be provided with wireless Internet services after automatically selecting and accessing a public Wireless Local Area Network (WLAN) or mobile communication network using his or her dual mode mobile phone or Personal Digital Assistant (PDA). Further, in order to bill the user for services, accounting technology is used between networks. Further, authorization technology is used as security technology for the authority of a roaming user. In this case, Network Access Identifier (NAI) expressed in the form of user@relam is used as an Identifier (ID) to identify a user or a mobile terminal. Different networks analyze NAIs to identify home networks of users and perform identification, authentication, authorization and accounting of the users.

Remote Authentication Dial-In User Service (RADIUS), which is prior art of AAA protocols, is a protocol for a small-sized network system that support only a small number of subscribers requiring client-server-based authentication. Therefore, RADIUS is not suitable for AAA services for communication service providers that must simultaneously support several hundreds to thousands of users on the basis of various technologies, and Internet service providers (ISP) that intend to steadily increase service capacities. Therefore, in order to solve the above problem, Diameter protocol has been developed.

Diameter protocol, which has been standardized as a draft for mobile IP/WLAN, can be defined as a Peer-based AAA protocol, which is simple and extensible to provide AAA services for conventional technology, such as Point-to-Point protocol (PPP), and new technology, such as roaming and mobile IP. A Diameter server can transmit messages fit for a Network Access Server (NAS) to process, and support reliable window communication-based transport, which can prepare for a communication failure. Moreover, a conventional RADIUS server cannot transmit messages if a client does not request the messages, while a Diameter server may transmit messages in case the Diameter server must inform the NAS of billing information or a connection release. Further, in the case of Diameter, retransmission and failure recovery functions are improved, and network recovery ability is higher than that of RADIUS with weak, slow characteristics. Further, Diameter is proposed to provide an end-to-end security technique, not supported by RADIUS, and support an extensible AAA protocol for a new generation, such as roaming and mobile IP network.

However, such an AAA protocol (Diameter) is designed so that application protocols are constructed on the basis of a base protocol, in which the base protocol itself performs an accounting function. Further, the AAA protocol is basically designed so that a real-time accounting function is obligatory and batch processing is excluded. Therefore, if the AAA protocol is applied as it is, the real-time accounting must be maintained. Moreover, if it is difficult to process accounting data due to a system overload during accounting or if accounting data cannot be normally processed due to a transmission failure, the accounting data, not processed, cannot be transmitted using the AAA protocol.

Diameter, having standardized recently, has many adaptabilities to accommodate a variety of services. However, as to the basic functions of authentication and accounting after authority verification, only a real-time accounting manner is specified in the base protocol. Further, Diameter specifies that only a single accounting record is transmitted by a one-time message (refer to IETF RFC 3588 <Diameter Base Protocol> P115, chapter 9.1). However, Diameter is problematic in that it cannot provide a batch processing technique having a real-time processing function and a function of processing accounting data failed in the real-time processing. Moreover, Diameter does not propose a method capable of executing simultaneous batch processing with respect to a plurality of accounting records.

FIG. 1 is a flowchart showing a real-time accounting process of AAA functions defined in the conventional AAA protocol (Diameter). As shown in FIG. 1, if an AAA server 11 receives a subscriber authentication request from an AAA client 12 at step 101, the AAA server 11 processes the subscriber authentication and then transmits a subscriber authentication response to the request to the AAA client 12 at step 102. Thereafter, if the AAA client 12 requests the AAA server 11 to transmit accounting message(ACR) at step 103, the AAA server 11 store accounting data to an accounting data storage 14 using a Diameter server base protocol 13, and transmits the response message(ACR) to the AAA client 12. At this time, if the accounting data transmission response succeeds at step 104-1, the AAA client 12 stores the accounting data in a first accounting data storage 16 using a Diameter client base protocol 15 at step 105. On the contrary, if the accounting data transmission response fails at step 104-2, the AAA client 12 stores the accounting data in a second accounting data storage 17 at step 106.

In FIG. 1, if the transmission of accounting data fails during the transmission after the AAA server 11 performs authentication, services provided to the AAA client 12 may be intercepted based on policies in some cases. For functions defined in the AAA protocol at the present time, an additional procedure or function does not exist in the case where the transmission of the accounting data fails or the transmission thereof is impossible during a routing procedure. That is, the AAA protocol specifies that real-time accounting must be implemented and an accounting function for batch processing is not supported. However, services connected to other networks do not realistically guarantee that accounting data is successfully transmitted in every case. Additionally, the influence of the services on a system load is so great that accounting cannot be performed in real-time. Therefore, real-time transmission may be meaningless, except for advance payment cards(Prepaid cards) or specially permitted specific subscribers confirmed in an authentication process. As added to the AAA protocol, having been recently completed in standardization, the accounting must be processed in real-time a later time. However, all problems cannot be solved using only the real-time accounting. That is, even though lower layers are designed on the basis of reliability, all failures of physical networks cannot be overcome. Therefore, a batch accounting function must be accepted to basically process real-time accounting, and supplement the real-time accounting according to accounting results to transmit the accounting data in a batch processing manner after a subscriber session has terminated. Especially, an accounting function in an AAA node needs to use batch processing as a selective method for a base protocol and requires a mechanism for processing batch accounting as an additional supplementary factor for failed accounting records at the time of real-time processing. The base protocol has required a function capable of accepting the mechanism.

SUMMARY OF THE INVENTION

The present invention provides an authentication, authorization and accounting (AAA) protocol-based accounting method using batch processing, which provides services based on batch accounting between service provides or networks from the first stage of the service after an AAA server performs an authentication function.

In addition, the present invention provides AAA protocol-based accounting method using batch processing, which basically processes real-time accounting, and processes accounting data, failed in transmission during the real-time accounting, in a batch processing manner.

In order to accomplish the above object, the present invention provides an Authentication, Authorization and Accounting (AAA) protocol (Diameter)-based accounting method using batch processing, the accounting method being performed by an AAA server connected to an AAA client, comprising the steps of a) the AAA server generating an accounting record to store accounting data and storing information on a session in the accounting record after the session between the AAA server and the AAA client is established; b) the AAA client generating the accounting data, transmitting an accounting data transmission request (ACR) message to the AAA server, and then receiving a response (ACA) message to the accounting data transmission request (ACR) message from the AAA server; c) if receiving a transmission failure response message for the accounting data from the AAA server, the AAA client storing accounting data generated after receiving the transmission failure response message, and if an amount of the stored accounting data is increased to a certain limit, setting an identifier (ID) for a batch accounting application in the accounting data and thus transmitting an accounting data transmission request (ACR) message, including stored batch accounting data and the session information stored at step a), to the AAA server; and d) the AAA server confirming both the identifier and the transmission request message (ACR), searching pieces of session information prestored in the accounting record for session information mapped to the session information included in the ACR message, and updating accounting data corresponding to the session information, thus responding to the AAA client.

In this case, the step b) may be performed so that the AAA client may store accounting data, generated in real-time based on batch processing between service providers, for a preset period, and then transmit the accounting data to the AAA server at once. In this case, in order to perform the batch accounting after the session has terminated, information used in the real-time session and the generated accounting data can be stored as a pair of information.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a view showing an example of a table in which IDs of a batch accounting application protocol for batch accounting are allocated according to the present invention;

FIG. 5 is a view showing the configuration of multi-accounting data information for batch accounting according to the present invention;

DESCRIPTION OF THE PREFERRED EMBODIMENTS

Figure 1:
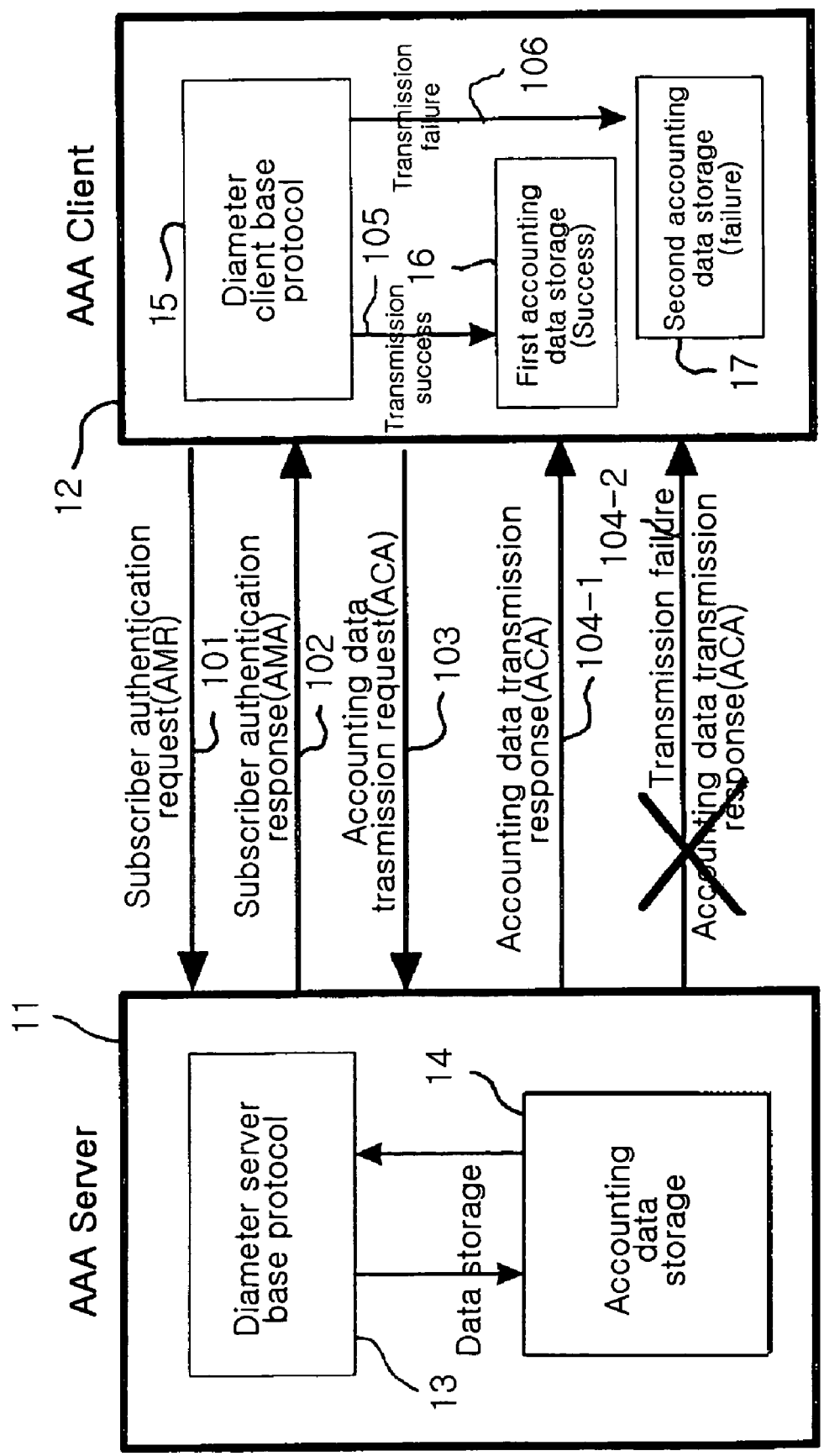
FIG. 1 is a flowchart showing a real-time accounting process of AAA functions defined in a conventional AAA protocol (Diameter)

A network of a Diameter-based AAA system is comprised of a foreign network, a broker network and a home network. The foreign network and the home network include a Diameter-based AAA server for providing an authentication, authorization verification and accounting services to users and an AAA client for performing wired/wireless authentication. Further, the foreign network may selectively include a proxy server for mediating AAA messages between AAA severs, and a redirect server for providing a server address redirecting service. The AAA services include Point-to-Point protocol (PPP) authentication, Asymmetric Digital Subscriber Lines (ADSL) subscriber authentication, and Wireless LAN (WLAN) subscriber authentication service. Further, in the case of a network allowing the roaming of subscribers, the AAA services may include authentication of another network subscriber between networks, authentication of a mobile subscriber in a foreign network and the like.

The present invention relates to an AAA protocol-based accounting method using batch processing. The present invention provides an accounting server constructed to enable an AAA server, which performs authentication, authorization and accounting of a subscriber in wired/wireless networks, to execute batch processing, not real-time processing, in accounting functions, and further provides an accounting method, which executes batch processing by a related system. The present invention provides a method of performing an authentication server function using Diameter having been standardized through a Diameter server and then performing an accounting function enabling batch processing to supplement real-time accounting in the accounting function. Therefore, the present invention authenticates all mobile/wired/wireless subscribers at the time of roaming, reduce a load for real-time accounting, and provides a service for perfectly supplementing accounting data, failed in real-time transmission, later through security transmission enabling the transmission of only accounting data.

In the case of the real-time accounting, a lot of traffic is generated between service providers, and a considerable amount of load is generated with respect to later accounting, such as accounting based on the number of packets used or accounting based on Quality Of Service (QoS). Therefore, it is difficult process data on the numbers of packets used by all users in real-time. Therefore, the present invention processes real-time accounting with respect to users having advanced or deferred payment cards, corresponding to specific subscribers, and processes accounting in a batch processing manner at night when Internet traffic is relatively light, without processing real-time accounting with respect to the most remaining users, thus reducing a load between the service providers.

Further, a current IETF Standard protocol structure does not have a mechanism capable of transmitting again accounting data of subscribers, failed in transmission during a real-time transmission process. Accordingly, it means that the processing of all accounting data must be completed during the provision of services.

Hereinafter, embodiments of the present invention will be described in detail with reference to the attached drawings.

Reference now should be made to the drawings, in which the same reference numerals are used throughout the different drawings to designate the same or similar components.

Figure 2:
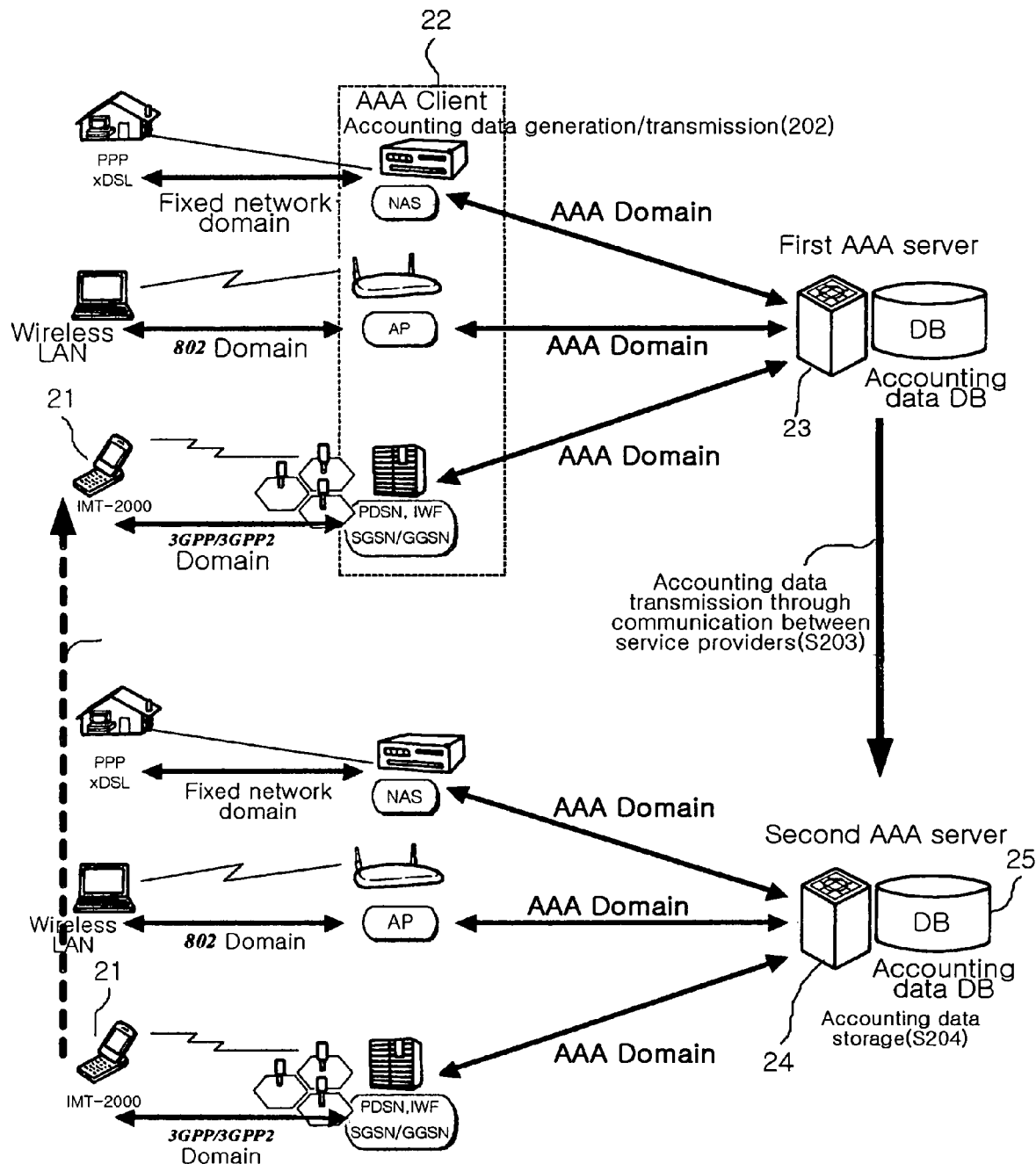
FIG. 2 is a view showing the construction of communication service provider networks including AAA servers according to an embodiment of the present invention.

FIG. 2 is a view showing the construction of communication service provider networks including AAA servers according to an embodiment of the present invention. In the network construction, the AAA servers perform an authentication server function and an accounting server function, and service providers communicate with each other. With reference to FIG. 2, accounting data processing for mobile IPs is described, which is one of AAA applications in communication service provider networks enabling communication between service providers. If a mobile subscriber 21 moves to a foreign communication service provider network from a home communication service network including a second AAA server 24 at step S201, the. mobile subscriber 21 accesses a first AAA server 23 through an AAA client 22 within the foreign communication service provider network. In this case, the AAA client 22 generates accounting data for the subscriber 21 and transmits the accounting data to the first AAA server 23 at step S202. The first AAA server 23 performs authentication, authorization and accounting of the subscriber 21, and, simultaneously, receives the accounting data transmitted from the AAA client 22 and transmits the accounting data to the second AAA server 24 communicating with the first AAA server 23 between service providers at step S203. As described above, the accounting data for the subscriber 21 is transmitted to the second AAA server 24, which is a server of the home communication service provider network. The second AAA server 24 stores the accounting data in an accounting data storage 25 at step S204.

The above-described batch processing scheme of AAA can be applied to Network Access Server Requirements (NAS-REQ) (Extensible Authentication Protocol: EAP) applications for public WLANs, as well as mobile IP applications.

Figure 3:
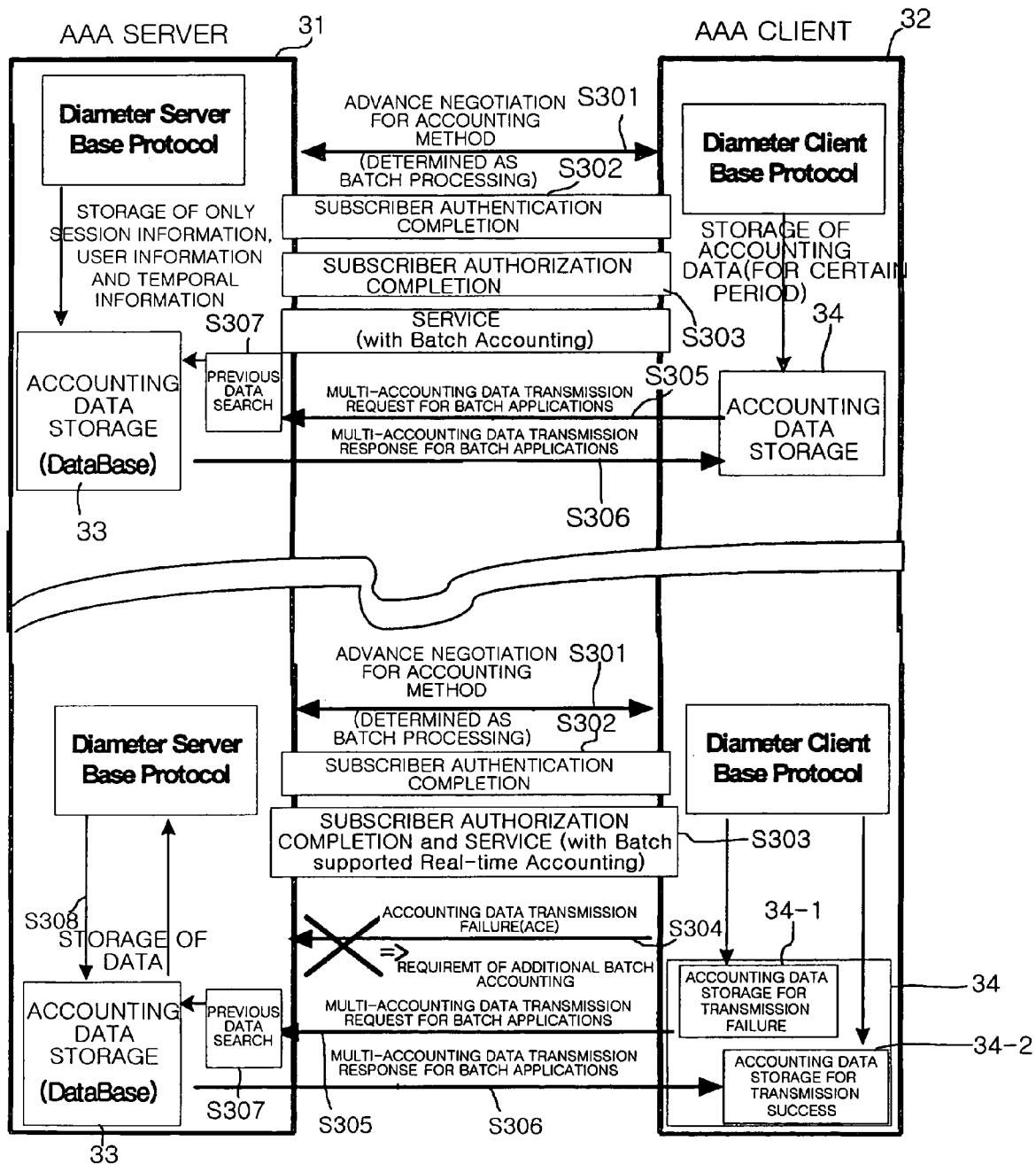
FIG. 3 is a flowchart showing an AAA protocol-based multi-accounting process using batch processing according to the present invention.

FIG. 3 is a flowchart showing an AAA protocol-based multi-accounting process using batch processing according to the present invention. FIG. 3 shows a process of storing failed accounting data in an AAA client for a certain period, concentrating the failed accounting data, and then transmitting the failed accounting data through a multi-accounting data transmission request (ACR) of batch applications, in the case where the transmission of accounting data fails while performing the AAA functions between an AAA server and the AAA client communicating with the AAA server. Further, the accounting process of FIG. 3 is used even in the case where only batch processing is determined to be carried out without real-time accounting, depending on accounting policies defined in advance. In this case, the process of FIG. 3 is described using mobile IP, which is one of AAA applications, as an example.

As shown in FIG. 3, the multi-accounting process using batch processing of the present invention can be divided into two cases, a case of batch accounting as typical method and a case of batch supported real-time accounting method.

First, if accounting is set to be processed in a batch processing manner in an accounting negotiation process executed in advance at step S301, a subscriber authentication process at step S302 and authority verification at step S303 are executed and a corresponding service is provided. Further, if an accounting time for batch processing is reached after a predetermined period has elapsed, all accounting data, obtained while the service is provided, are transmitted to an AAA server 31. Therefore, if an AAA client 32 transmits a multi-accounting data transmission request for batch processing to the AAA server 31 at step S305, the AAA server 31 receives the transmission request, searches an accounting data storage 33 for an empty accounting data space using previously stored session information, user information and temporal information, safely stores the accounting data in the empty accounting data space, and transmits a multi-accounting transmission response for batch processing to the AAA client 32 as a response to the above step S305 at step S306, thus completing the process. At this time, the AAA client 32 stores the accounting data in an accounting data storage 34. As described above, the present invention stores the session information, the user information and the temporal information for batch processing in the real-time service authentication process, searches for previous session data using the previously stored data as a medium when a batch processing protocol and messages used to process multi-accounting data are received later, and then updates the session data, thus accurately processing the accounting.

Second, if a transmission failure occurs in the real-time accounting process, an advance negotiation for the accounting is performed at step S301. Further, after the AAA server 31 processes subscriber authentication with respect to the AAA client 32 at step S302, it processes authority verification for a subscriber at step S303. Further, in the case of real-time accounting, a transmission fails due to a network problem and then is stopped when the accounting is performed at step S304. However, the service can be continuously provided. In this case, in order to perform accounting data, an accounting data storage 34-1, storing accounting data failed in transmission, transmits the multi-accounting data transmission request for batch applications to the AAA server 31 at a specific time (for example, at night when the amount of traffic transmitted is small) to execute the batch processing of the accounting data failed in transmission between service providers after the service has been completed and then a predetermined period has elapsed at step S305. The AAA server 31 transmits the response to the transmission request at step S306. The AAA server 31 searches the accounting data storage 33 for previous data using the session information, the user information and the temporal information at step S307. Further, the AAA server 31 updates the searched accounting data and then safely stores the updated data in the accounting data storage 33.

The above operation is described in detail below. With reference to FIG. 3, an authentication process of AAA protocol with batch supported real-time accounting taken into consideration and a batch accounting procedure is added when the transmission of real-time accounting data fails, are described. First, if a user accesses an AAA client 32 to request an access to a communication service network, the AAA client 32 receives authentication information of the user and transmits the authentication information to an AAA server 31, thus requesting the authentication of the user from the AAA server 31 at step S302. The AAA server 31 completes the user authentication, and generates data related to a cause of authentication success or failure when the user authentication succeeds or fails, and then transmits the data to the AAA client 32 at step S302. In this case, if the information of the user is valid and the authentication succeeds, the AAA server 31 transmits the authentication results of the user to the user (subscriber). Further, when the authentication succeeds, the AAA server 31 generates a new record so as to store new accounting information, and stores basic subscriber information and session information in the new record. At this time, basic information for accounting and session activation information, which can be mapped in batch processing, are included in the new accounting information and stored in the new record.

The AAA client 32 informs the user whether the user is allowed or denied to access resources requested by the user. If the user is allowed to access the resources, the user can be supplied with services provided from the network. At this time, the AAA client 32 generates accounting data, generates an accounting data transmission request (ACR) message including the accounting data to meet an AAA protocol, and transmits the ARC message to the AAA server 31 at step S305. Thereafter, the AAA server 31 confirms the received ACR message, and stores the accounting data included in the ACR message in an accounting data storage 33 at step S308. Meanwhile, the AAA server transmits a response message to an AAA server of another network according to routing information after storing the accounting data in the accounting record, and the AAA server transmits the accounting data to an AAA client requesting authentication.

Further, the AAA server 31 transmits accounting data corresponding to the ACR message to the AAA client 32. At this time, if the transmission of accounting data succeeds, the AAA client 32 confirms success in the transmission of the accounting data. If the transmission of accounting data fails at step S304, the AAA client 32 confirms a failure in the transmission of the accounting data.

In the case where the transmission of the accounting data fails, additional batch accounting is required, and multi-accounting using batch processing is performed after a predetermined period has elapsed. That is, if the predetermined period has elapsed or if the amount of accounting data, which must be transmitted in a batch processing manner, is increased to a certain limit and stored in an accounting data storage 34 used at the time of failure, a session for batch processing starts. The session is used to perform batch accounting, and corresponds to a procedure used in only accounting, differently from conventional AAA procedures. In this case, the AAA client 32 sets an ID for a batch accounting application, generates an accounting request (ACR) message including a plurality of pieces of batch accounting data and session information, previously used in respective AAA sessions, and transmits the accounting request (ACR) message to the AAA server 31 at step S305. The AAA server 31 confirms the accounting request (ACR) message, searches previous accounting data stored in a previous accounting data storage 35 for a corresponding session matched with received session information, and updates accounting information of the corresponding session. Then, the AAA server 31 generates an accounting response (ACA) message including the updated results and transmits the accounting response (ACA) message to the AAA client 32 at step S306. After the session has been completed, both the AAA server 31 and the AAA client 32 terminate the session by transmitting and receiving a session termination message.

FIG. 4 is a view showing an example of a table in which IDs of a batch accounting application protocol for batch accounting are allocated according to the present invention. As shown in FIG. 4, the IDs of the batch accounting application protocol for batch processing of the present invention are added to conventional application protocol IDs, and used thereby. The batch accounting application protocol IDs have temporary values and will have specific values if they are standardized and adopted later. There are conventional application protocols, such as a mobile IP or NASREQ. A difference between the batch accounting application protocol and the conventional application protocols is that the conventional application protocols require an authentication process, but the batch multi-accounting application protocol is defined as an application model having only an accounting process without the authentication process. Therefore, the batch multi-accounting application protocol IDs and the conventional application protocol IDs are identified according to applications included in AAA messages, and require a separate process and a state transition.

FIG. 5 is a view showing the configuration of multi-accounting data information for batch accounting according to the present invention. As shown in FIG. 5, a data 51 stored in a server is classified into session data 52 generated during an authentication process executed to allow the subscriber to be provided with services, and accounting related data 53 which has failed in transmission or is not originally transmitted. That is, the session data 52 is stored in both the server and the client, and intact accounting data 53 is stored in only client. Data, transmitted from the client for batch processing, must include session data used in a previous authentication process, and a session of a corresponding subscriber can be searched for using the session data.

The session data 52, used to search for the session of the corresponding subscriber, may include a service type, an AAA system identifier, a client domain, a client session ID, an accounting multi-session ID, an accounting sub-session ID, and a subscriber NAI as mapping information. Since an exact session cannot be searched for using only one of the plural information values, session data values are compared to seek a previous accounting record. That is, previously processed accounting results are necessary, and the supplement using the batch processing is performed according to the results.

Figure 6:
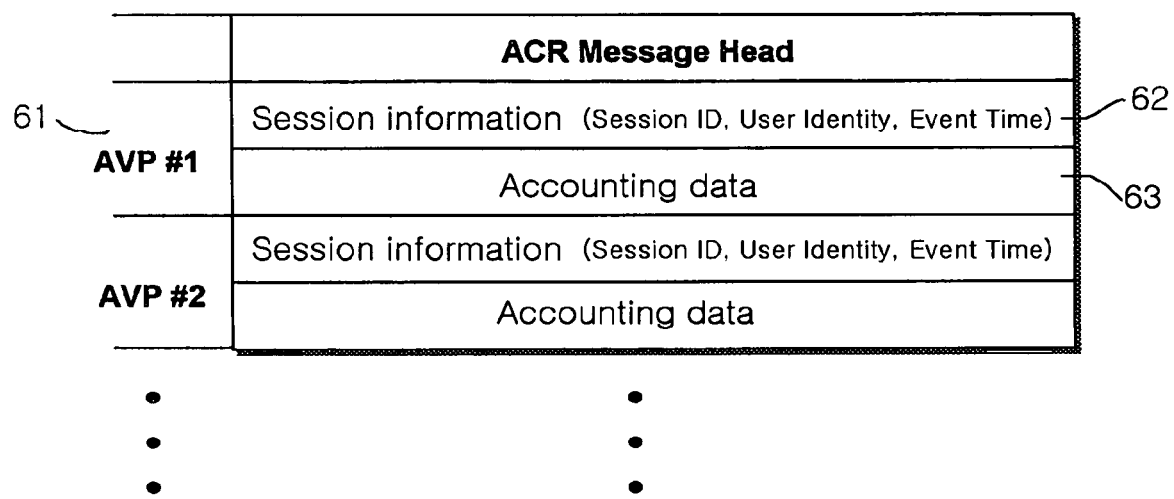
FIG. 6 is a view showing the configuration of information transmitted to perform batch accounting according to the present invention.

FIG. 6 is a view showing the configuration of information transmitted to perform batch accounting according to the present invention. As shown in FIG. 6, accounting data 63 for one session 62 forms a piece of accounting policy information (AVP: Attribute Value Pair) 61. That is, the session information 62 and the accounting information 63 are separately stored in one AVP 61. The session information 62 is information mapped to data of a previous session, and the accounting information 63 corresponds to information to be actually updated. Both the accounting data 63 and the session information 62 are all formed in a group-type AVP format, in which the final pieces of information exist in the form of AVP. In this case, AVP #1 and AVP #2 for batch processing may be vender specific AVP, or may be specifically defined as a standard protocol later.

Figure 7:
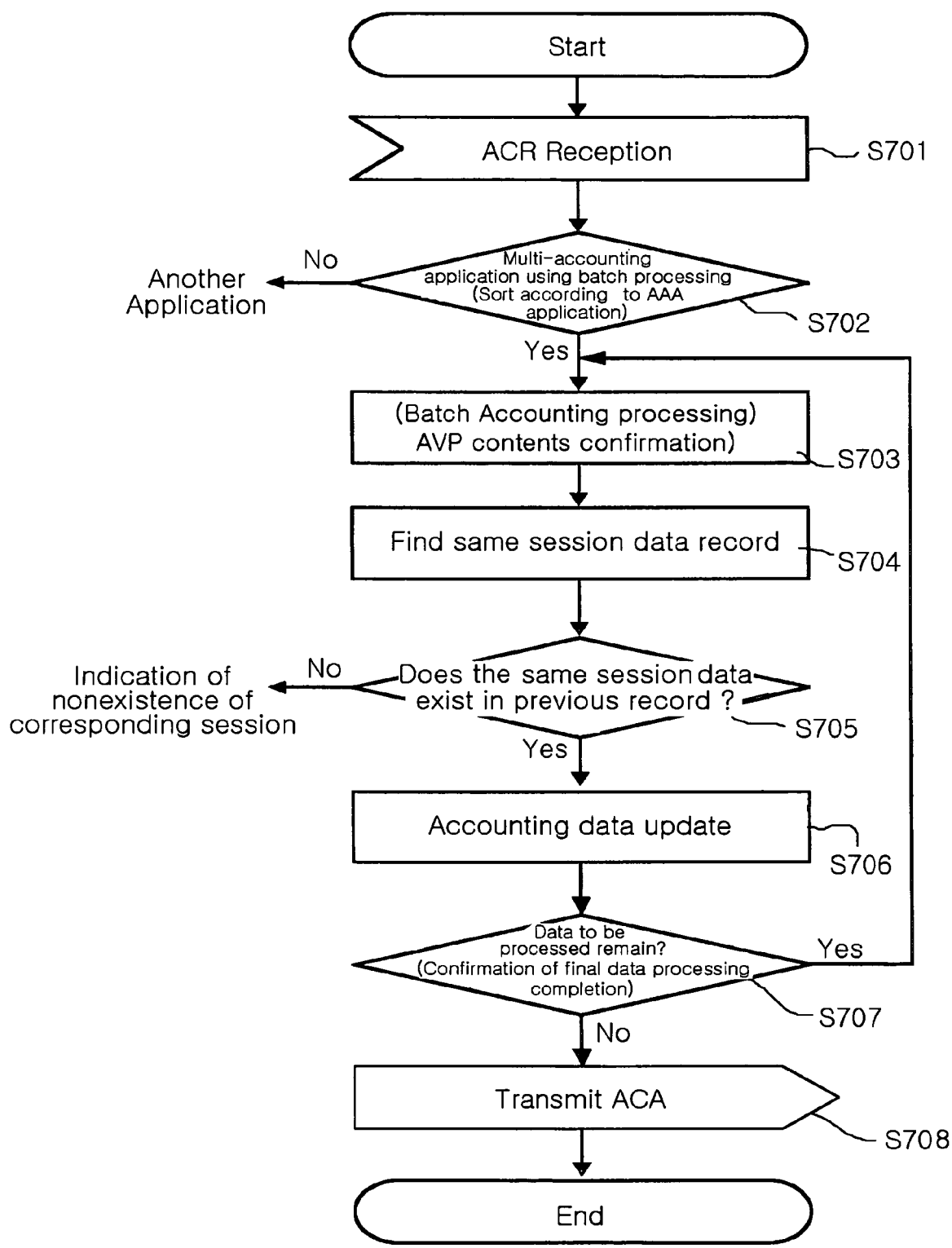
FIG. 7 is a flowchart showing a process of mapping and storing accounting data transmitted in a batch processing manner according to the present invention.

FIG. 7 is a flowchart showing a process of mapping and storing accounting data transmitted in a batch processing manner according to the present invention. If the AAA server 31 receives an accounting data transmission request (ACR) from the AAA client 32 after an authentication process between the AAA server 31 and the AAA client 32 has been completed at step S701, the AAA server 31 sorts the accounting data transmission request (ACR) according to AAA applications to determine whether the ACR corresponds to a multi-accounting application using batch processing at step S702. If the ACR does not correspond to the multi-accounting application using batch processing at step S702, the AAA server 31 processes the ACR according to another application. If the ACR corresponds to the multi-accounting application using batch processing at step S702, the AAA server 31 continuously performs the batch accounting by confirming the contents of AVP at step S703. According to the confirmed results for the AVP contents, the AAA server 31 finds same session data record at step S704 and determines whether there is a session mapped to received session data at step S705. If there is no corresponding session, the AAA server 31 indicates that a corresponding session does not exist, while if there is a corresponding session, the AAA server 31 searches for the corresponding session to update accounting data at step S706. Thereafter, the AAA server 31 moves to a next content included in the AVP to determine whether data to be processed remains at step S707. If data to be processed remains, the AAA server 31 performs step 703. If data to be processed does not remain, the AAA server 31 recognizes that final data is completely processed, and then transmits an accounting data transmission completion (ACA) message to the AAA client 32 at step S708. After the session has been completed, the AAA server 31 and the AAA client 32 terminate the session by transmitting and receiving a session termination message.

As described above, in an AAA protocol-based accounting method using batch processing of the present invention, an accounting function of an AAA node enables a safer and more reliable network than a conventional network dependent on only the real-time accounting to be constructed.

Further, since a function of processing failure recovery by a system is limited, a network of the present invention is designed so that failure management and status management are processed even on accounting records, and then intact data is additionally transmitted when error or failure occurs, thus improving the reliability of the network.

Further, even though accounting data is transmitted later in a batch accounting manner, there is a basis for determining whether data received from an external foreign network is valid because accounting data previously obtained through a Home Agent (HA), which is an AAA client in a home network, exists.

Further, according to the present invention, important accounting data closely connected to yields is not lost and can be recovered later when a transmission failure occurs due to a system load, and the reliability of AAA functions can be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An Authentication, Authorization and Accounting (AAA) protocol (Diameter)-based accounting method using batch processing, the accounting method being performed by an AAA server connected to an AAA client, comprising the steps of:
   a) the AAA server generating an accounting record-space to store accounting data and storing information on a session in the accounting record after the session between the AAA server and the AAA client is established;
   b) the AAA client generating the accounting data, transmitting an accounting data transmission request (ACR) message to the AAA server, and then receiving a response (ACA) message against(to) the accounting data transmission request (ACR) message from the AAA server;
   c) if receiving a transmission failure response message for the accounting data from the AAA server, the AAA client storing accounting data generated after receiving the transmission failure response message, and if an amount of the stored accounting data is increased to a certain limit, setting an identifier (ID) for a batch accounting application in the accounting data and thus transmitting an accounting data transmission request (ACR) message, including stored batch accounting data and the session information stored at step a), to the AAA server; and
   d) the AAA server confirming both the identifier and the transmission request (ACR) message, searching pieces of session information pre-stored in the accounting record for session information mapped to the session information included in the ACR message, and updating accounting data corresponding to the session information, thus responding to the AAA client.

2. The AAA protocol-based accounting method using batch processing according to claim 1, further comprising the step of mutually negotiating information on policies for batch accounting in advance between service providers or networks using the AAA protocol so as to perform communication between AAA servers.

3. The AAA protocol-based accounting method using batch processing according to claim 2, wherein the negotiating step is performed so that advance accounting policies for batch accounting are negotiated.

4. The AAA protocol-based accounting method using batch processing according to claim 1, wherein the step b) is performed so that the AAA client stores the generated accounting data for a preset period, and then transmits the accounting data to the AAA server at once.

5. The AAA protocol-based accounting method using batch processing according to claim 4, wherein the identifier (ID) for the batch accounting application is set in such a way that a new application protocol identifier or a header bit of a message is separately set.

6. The AAA protocol-based accounting method using batch processing according to claim 1, wherein the step c) further comprises the step of starting a session for batch processing accounting.

7. The AAA protocol-based accounting method using batch processing according to claim 1, wherein the step c) is performed so that, if the preset period has elapsed before the amount of the stored accounting data is increased to a certain limit, the AAA client sets the batch accounting application identifier in the accounting data and transmits the accounting data transmission request (ACR) message, including the batch accounting data and the session information stored at step a), to the AAA server.

8. The AAA protocol-based accounting method using batch processing according to claim 1, wherein, at the step c), the batch accounting application is defined as an application model including only accounting transmission without an authentication process between the AAA server and the AAA client.

9. The AAA protocol-based accounting method using batch processing according to claim 1, wherein the step c) is performed so that the AAA client transmits the generated batch accounting data and the session information stored at step a) in the form of group-type accounting polity information (AVP), the batch accounting data including a plurality of pieces of accounting policy information (AVP) therein.

* * * * *